HENRY BISBING.
Protecting Unslacked Lime.

No. 118,680. Patented Sep. 5, 1871.

Witnesses,
Thos. McIlvain
Harry Smith

Henry Bisbing
by his Attr.
Howson and Son

UNITED STATES PATENT OFFICE.

HENRY BISBING, OF BRIDGETON, NEW JERSEY.

IMPROVEMENT IN PROTECTING UNSLAKED LIME AND APPARATUS THEREFOR.

Specification forming part of Letters Patent No. 118,680, dated September 5, 1871.

*To all whom it may concern:*

Be it known that I, HENRY BISBING, of Bridgeton, county of Cumberland, State of New Jersey, have invented an Improvement in Protecting Unslaked Lime and Apparatus Therefor, of which the following is a specification:

My invention consists of a process of protecting unslaked lime from the injurious effects of heat and moisture by inclosing it within a double casing, between the walls of which is packed plaster of Paris or other equivalent protecting medium; and my invention also consists of a casing having one or more compartments, with double walls and double doors, and by which the above process may be carried into effect, all as fully described hereafter.

Figure 1:
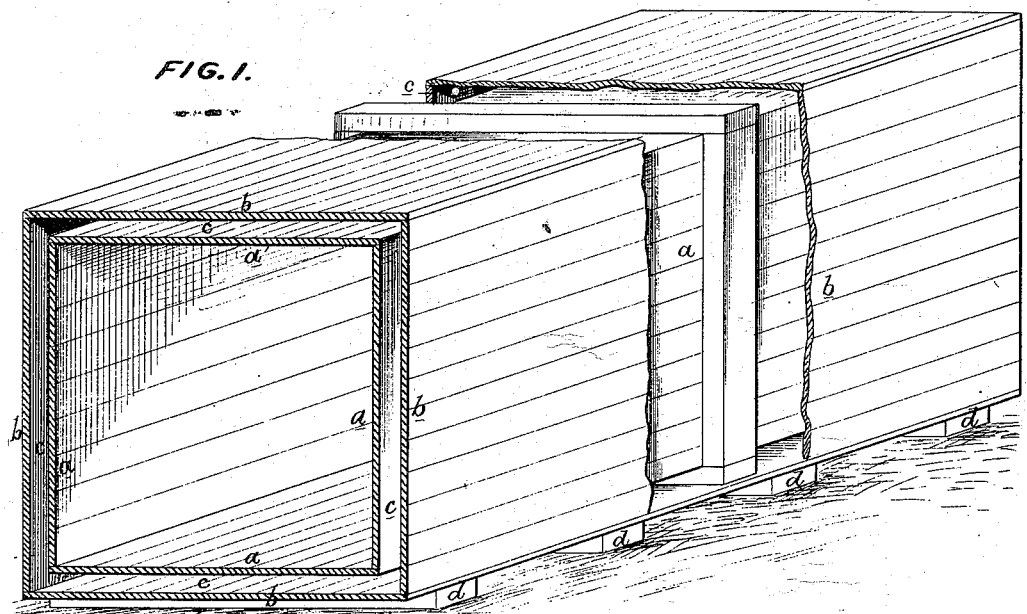
Figure 2:
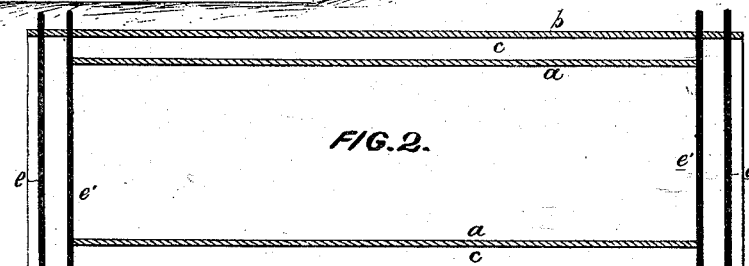

Figure 1 is a sectional perspective view of one form of protecting-casing by which my invention may be carried into effect; Fig. 2, a longitudinal section of the same; and Fig. 3, a perspective view of a casing with several compartments.

Lime, after having been burned and cooled, if exposed to the air and heat of the sun, is very apt to fall or become slaked, owing to the absorption of moisture. This is especially the case in the summer season, and, as such dry slaked or fallen lime is absolutely worthless as lime, thousands of bushels are thus annually lost to both manufacturers and dealers. Lime is also apt to become heated during transportation in canal-boats from the kilns to the point or points of consumption, and when thus heated it is very liable to fall or become slaked shortly after being removed from the boat, if exposed to further heat and a damp atmosphere. The object of my invention is to protect lime, in any quantity, whether large or small, from the injurious effects of heat and moisture; and this I accomplish by inclosing the lime within casings, chambers, or even buildings made with one or more compartments having double walls and double doors, the spaces between which are packed with plaster of Paris, slaked lime, or other equivalent material which will absorb the moisture of the atmosphere and prevent the latter from gaining access to the lime.

These protecting-casings may be made of wood or other suitable material, and of any size, shape, and arrangement which will best suit the wants of the packer or dealer.

In the drawing are represented two forms of casings, both of which I have submitted to severe practical tests with the most satisfactory results.

The casing shown in Figs. 1 and 2 is constructed of wood, of an oblong and rectangular shape, and has double walls $a$ and $b$, the intervening space $c$ between which is packed with plaster of Paris, slaked lime, or equivalent absorbent material. The casing is also raised slightly above the ground by cross-pieces $d$, and is provided at each end with double sliding doors $e$ $e'$, the spaces between which are also filled with plaster of Paris or its equivalent.

I have preserved lime in a casing constructed as above described for several months without having it undergo the slightest appreciable change.

Figure 3:
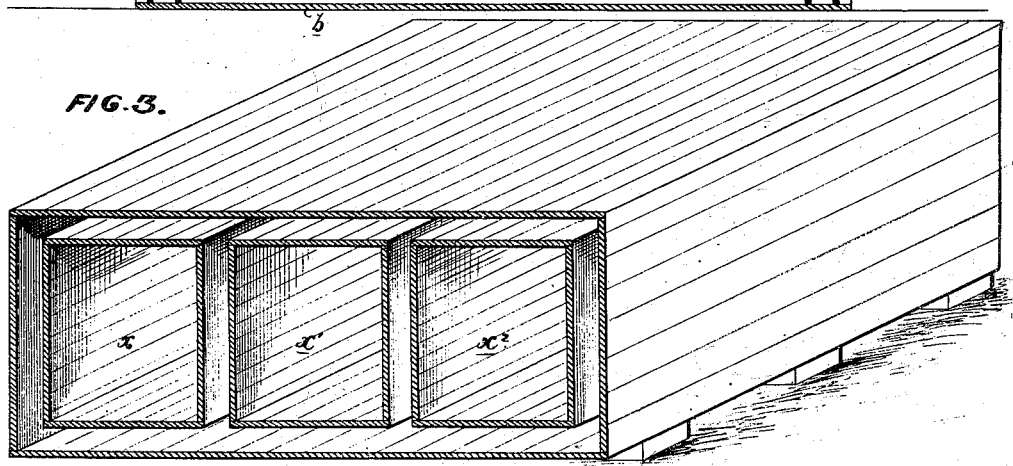

The casing illustrated in Fig. 3 is constructed with several separate compartments, $x$ $x'$, &c., and is intended more especially for the use of dealers, as this arrangement enables all or a portion of the lime to be removed from one compartment without exposing that contained in the others.

I claim—

1. The protecting of unslaked lime from the injurious effects of heat and moisture by inclosing it within a double casing, between the walls of which is packed plaster of Paris or other equivalent protecting medium.

2. The within-described casing, having one or more compartments and double doors, substantially as set forth.

In testimony whereof I have signed my name to this specification in the presence of two subscribing witnesses.

HENRY BISBING.

Witnesses:
GEORGE STARK,
P. HAND.